US012157661B2

(12) United States Patent
Chang et al.

(10) Patent No.: US 12,157,661 B2
(45) Date of Patent: Dec. 3, 2024

(54) WATER PURIFIER WITH ICE-MAKER

(71) Applicant: COWAY CO., Ltd., Gongju-si (KR)

(72) Inventors: Min-Suk Chang, Seoul (KR); Yong-Yeon Noh, Seoul (KR); Woo-Jin Joo, Seoul (KR); Myeong-Hoon Kang, Seoul (KR); Ki-Hong Min, Seoul (KR); Jin-Woo Choi, Seoul (KR); Young-Jae Lee, Seoul (KR); Dong-Hui Kim, Seoul (KR); Sang-Jin Youn, Seoul (KR); Gyeong-Jong Kim, Seoul (KR)

(73) Assignee: COWAY CO., Ltd., Gongju-si (KR)

( * ) Notice: Subject to any disclaimer, the term of this patent is extended or adjusted under 35 U.S.C. 154(b) by 0 days.

(21) Appl. No.: 17/999,369

(22) PCT Filed: May 18, 2021

(86) PCT No.: PCT/KR2021/006221
§ 371 (c)(1),
(2) Date: Nov. 18, 2022

(87) PCT Pub. No.: WO2021/235832
PCT Pub. Date: Nov. 25, 2021

(65) Prior Publication Data

US 2023/0234828 A1 Jul. 27, 2023

(30) Foreign Application Priority Data

May 21, 2020 (KR) ........................ 10-2020-0061178

(51) Int. Cl.
*B67D 1/08* (2006.01)
*B67D 1/12* (2006.01)
(Continued)

(52) U.S. Cl.
CPC ......... *B67D 1/0895* (2013.01); *B67D 1/0801* (2013.01); *B67D 1/0857* (2013.01);
(Continued)

(58) Field of Classification Search
CPC .. B67D 1/0895; B67D 1/0801; B67D 1/0857; B67D 1/1206; B67D 2001/0093;
(Continued)

(56) References Cited

U.S. PATENT DOCUMENTS

| | | | | |
|---|---|---|---|---|
| 10,214,409 | B2 | 2/2019 | You et al. | |
| 2009/0249821 | A1 * | 10/2009 | Zentner | F25D 31/005 219/494 |

(Continued)

FOREIGN PATENT DOCUMENTS

| | | | |
|---|---|---|---|
| JP | 2016-151977 | A | 8/2016 |
| KR | 10-2011-0080657 | A | 7/2011 |

(Continued)

OTHER PUBLICATIONS

Translation of KR20110080657, Epo.org,, Mar. 9, 2024 (Year: 2024).*

(Continued)

*Primary Examiner* — Vishal Pancholi
*Assistant Examiner* — Robert K Nichols, II
(74) *Attorney, Agent, or Firm* — Oblon, McClelland, Maier & Neustadt, L.L.P.

(57) ABSTRACT

An ice-making water purifier includes a water tank unit, an instantaneous heating device, an extraction member, an ice-maker, a supply pump, an ice-making water inlet passage, an ice-making water supply valve, a flow rate sensor, and a controller configured to control driving of the supply pump and the opening and closing of the ice-making water supply valve such that purified water corresponding to a predetermined supply amount of ice-making water is supplied to the ice-maker on the basis of a flow rate value measured by the flow rate sensor. The controller controls the opening and closing of the channel such that purified water
(Continued)

is preferentially supplied to the instantaneous heating device among the instantaneous heating device and the ice-maker.

10 Claims, 4 Drawing Sheets

(51) Int. Cl.
*F25C 1/25* (2018.01)
*B67D 1/00* (2006.01)

(52) U.S. Cl.
CPC .............. *B67D 1/1206* (2013.01); *F25C 1/25* (2018.01); *B67D 2001/0093* (2013.01); *B67D 2001/0097* (2013.01); *B67D 2210/0001* (2013.01); *F25C 2700/00* (2013.01)

(58) Field of Classification Search
CPC .... B67D 2001/0097; B67D 2210/0001; F25C 1/25; F25C 2700/00
USPC .............................................................. 22/52
See application file for complete search history.

(56) References Cited

U.S. PATENT DOCUMENTS

| | | | | |
|---|---|---|---|---|
| 2015/0225226 | A1 | 8/2015 | You et al. | |
| 2018/0195793 | A1* | 7/2018 | Kim | F24H 1/102 |
| 2021/0268440 | A1* | 9/2021 | Moon | B67D 1/08 |

FOREIGN PATENT DOCUMENTS

| | | | |
|---|---|---|---|
| KR | 10-2014-0121234 | A | 10/2014 |
| KR | 10-2015-0094905 | A | 8/2015 |
| KR | 10-2019-0079140 | A | 7/2019 |

OTHER PUBLICATIONS

International Search Report mailed on Aug. 26, 2021 in PCT/KR2021/006221 filed on May 18, 2021 (2 pages).

* cited by examiner

WATER PURIFIER WITH ICE-MAKER

TECHNICAL FIELD

The present invention relates to an ice-making water purifier having both a water purifying function and an ice generating function, and more particularly, to an ice-making water purifier having an instantaneous heating device and an ice-making unit.

BACKGROUND ART

A water purifier is a device for generating purified water by filtering raw water through a filter unit having a plurality of filters, and may not only provide room temperature purified water but also hot water and/or cold water to a user. In addition, an ice water purifier equipped with an ice-making unit for generating ice as well as a water purifying function has recently been used.

The ice water purifier generates ice by supplying purified water filtered by the filter unit to the ice-making unit. In this case, the purified water filtered by the filter unit is accommodated in a purified water tank and then supplied to the ice-making unit to be used to produce ice.

The conventional ice water purifier controls an opening time of an ice-making water supply valve disposed on a passage connecting a purified water tank and an ice-making water inlet of the ice-making unit with a timer, such that a method of supplying ice-making water (purified water) from the purified water tank to the ice-making unit for a predetermined time (timer operation time) was used. In addition, by locating the purified water tank at an upper end of a side of a water inlet of the ice-making unit, the purified water contained in the purified water tank moved to the ice-making unit due to a difference in water head (water pressure).

However, the conventional ice water purifier had a difference in an amount of purified water (ice-making water) supplied to the ice-making unit depending on a difference in water level (for example, a full water level and a low water level) of the purified water stored in the purified water tank, so there was a limitation in supplying a certain amount of ice-making water.

Meanwhile, the conventional ice water purifier is configured to basically perform a water purification function of filtering water as well as an ice generating function, and typically has a function of providing hot water and/or cold water to a user. In order to extract hot water, the conventional ice water purifier often uses hot water tanks that heating and storing purified water, but recently, the conventional ice water purifier often uses an instantaneous heating device providing a user with instantaneous heating (rapid heating) of purified water flowing through an interior thereof in order to reduce power consumption.

Since the instantaneous heating device may generate steam due to overheating, the instantaneous heating device is installed below an extraction member from which hot water is extracted in order to secure safety in using the instantaneous heating device. Therefore, in order to extract hot water through the extraction member, it is necessary to pressurize water through a supply pump and supply the same to the instantaneous heating device.

When a hot-water extraction signal is input through a user's operation of a hot-water extraction button, or the like, a supply pump is configured to operate to supply purified water from the purified water tank to the instantaneous heating device using pressure, and power is applied to the instantaneous heating device such that heated hot-water is discharged.

Meanwhile, in the ice-making water purifier according to the prior art, when the user operates the hot-water extraction button while ice-making water (purified water) is being supplied from the purified water tank to the ice-making unit for ice-making, an operating for generating hot water could be performed only after the supply of ice-making water was finished.

Specifically, in the ice-making water purifier according to the prior art, the supply of ice-making water from the purified water tank to the ice-making unit is controlled through a timer for a predetermined period of time (timer operation time), such that supply of ice-making water cannot be stopped in the middle. In particular, when the supply of ice-making water is forcibly stopped during a process of supplying ice-making water, the ice-making water is supplied to an ice-making tray in advance and remains, such that there is a problem that the ice-making water overflows the ice-making tray when the ice-making water is subsequently supplied through the timer.

As described above, the conventional ice water purifier cannot stop the supply of ice-making water, even when a hot-water extraction signal is input by a user. Therefore, the ice-making water purifier according to the prior art has a large amount of inconvenience in extracting hot water by a user because the user has to wait for a long time when the user wants to extract hot water in the middle of the ice-making water supply process.

In particular, since the supply of ice-making water is automatically performed when the control unit inside the ice-making water purifier generates an ice-making signal due to a decrease in an amount of ice contained in the ice storage, the user cannot forcibly stop the ice-making operation but also it is difficult for the user to easily recognize that the supply of the ice-making water is performed. Accordingly, when a user waits for a long time in the ice-making water purifier, there is a possibility of misunderstanding that a malfunction has occurred in the hot water extraction function.

SUMMARY OF INVENTION

Technical Problem

The present disclosure has been devised to solve at least some of the problems of the prior art as described above, and an aspect of the present disclosure is to provide an ice-making water purifier capable of immediately being switched to an operation for extracting hot water even when a user inputs a hot-water extraction signal while water is being supplied to an ice-making unit.

An aspect of the present disclosure is to provide an ice-making water purifier capable of stably supplying predetermined amount of water (ice-making water) to an ice-making unit.

An aspect of the present disclosure is to provide an ice-making water purifier capable of increasing a degree of design freedom for an installation position of an ice-making unit.

Another aspect of the present disclosure is to provide an ice-making water purifier capable of effectively using a supply pump and a flow rate sensor used in an instantaneous heating device to supply ice-making water, thereby reducing the number of parts and reducing the cost of parts.

Solution to Problem

According to an aspect of the present disclosure, provided is an ice-making water purifier, the ice-making water purifier including: a water tank unit for storing purified water; an instantaneous heating device having a water inlet through which purified water is supplied from the water tank unit and a water outlet through which purified water is heated and discharged, the instantaneous heating device for heating the purified water flowing into the water inlet to flow to the water outlet such that hot water is discharged through the water outlet; an extraction member located above the instantaneous heating device and extracting the hot water discharged from the instantaneous heating device by opening a hot-water extraction valve; an ice-making unit for receiving purified water from the water tank unit to produce ice; a supply pump configured to operate to supply purified water from the water tank unit to the instantaneous heating device and the ice-making unit using pressure; an ice-making unit water inlet passage branched from a passage connecting the supply pump and the instantaneous heating device, so as to be connected to the ice-making unit; an ice-making water supply valve provided in the ice-making unit water inlet passage and configured to be opened to supply purified water from the water tank unit to the ice-making unit; a flow rate sensor installed upstream of a point at which the ice-making unit water inlet passage is branched to measure a flow rate of the purified water supplied from the water tank unit to the instantaneous heating device and the ice-making unit, respectively; and a control unit for controlling driving of the supply pump and opening and closing of the ice-making water supply valve such that purified water corresponding to a predetermined supply amount of ice-making water is supplied to the ice-making unit on the basis of a flow rate value measured by the flow rate sensor, wherein the control unit controls opening and closing of the passage such that purified water is preferentially supplied to the instantaneous heating device among the instantaneous heating device and the ice-making unit.

In addition, the ice-making unit may be installed in a horizontal position with at least a portion of the water tank, such that purified water is introduced to the ice-making unit from the water tank unit by pressurization of the supply pump. In this case, the water tank unit may include a purified water tank for accommodating purified water at room temperature, and the ice-making unit may be installed in a horizontal position with at least a portion of the purified water tank.

When a hot-water extraction signal is input, the control unit may be configured to close the ice-making water supply valve and drive the supply pump such that purified water is preferentially supplied to the instantaneous heating device.

In this case, when the hot-water extraction signal is input, the control unit may be configured to perform an initial drain process of draining purified water initially supplied to the instantaneous heating device according to a predetermined first drain condition, and after the initial drain process is performed, the control unit may be configured to open the hot-water extraction valve such that hot water may be extracted through the extraction member.

In addition, when a hot-water extraction signal is input while purified water is being supplied to the ice-making unit by opening the ice-making water supply valve, the control unit may be configured to close the ice-making water supply valve such that supply of purified water to the ice-making unit is blocked by closing the ice-making water supply valve, and supply of purified water may be performed to the instantaneous heating device, and when the supply of purified water to the instantaneous heating device is stopped, the control unit may be configured to open the ice-making water supply valve again such that the remaining amount of purified water, not supplied to the ice-making unit among the supply amount of the ice-making water may be supplied to the ice-making unit.

In this case, the control unit may be configured to accumulate an amount of purified water supplied to the ice-making unit based on a measured value of the flow rate sensor, store the accumulated amount of purified water supplied until the hot-water extraction signal is input and the ice-making water supply valve is closed, and control supply of purified water to the ice-making unit based on the accumulated amount of purified water when the supply of purified water to the ice-making unit is resumed.

In addition, when the hot-water extraction end signal is input, the control unit may be configured to perform a terminal drain process of draining the hot water accommodated in the instantaneous heating device according to a predetermined second drain condition, and after the terminal drain process is performed, the control unit may be configured to stop supply of purified water to the heating device, and the control unit may be configured to open the ice-making water supply valve again such that purified water may be supplied to the ice-making unit.

When an ice-making signal for generating ice is input in a state in which purified is supplied to the instantaneous heating device, the control unit may be configured to prevent supply of purified water to the ice-making unit until the supply of purified water to the instantaneous heating device is finished, and after the supply of purified water to the instantaneous heating device is finished, the control unit may be configured to open the ice-making water supply valve such that purified water corresponding to the supply amount of ice-making water may be supplied to the ice-making unit.

Meanwhile, the control unit may be configured to control a voltage or current applied to the instantaneous heating device based on a flow rate value supplied to the instantaneous heating device measured by the flow rate sensor.

According to another aspect of the present disclosure, provided is an ice-making water purifier, the ice-making water purifier including: a filter unit having at least one filter for generating purified water; an instantaneous heating device having a water inlet through which purified water filtered by the filter unit and a water outlet through which purified water is heated and discharged, and heating the purified water flowing into the water inlet and flowing out to the water outlet such that hot water is discharged through the water outlet; an extraction member located above the instantaneous heating device and extracting the hot water discharged from the instantaneous heating device by opening a hot-water extraction valve; an ice-making unit for receiving the purified water filtered by the filter unit to produce ice; a supply pump configured to operate the purified water filtered by the filter unit using pressure to the instantaneous heating device and the ice-making unit; an ice-making water inlet passage branched from a passage connecting the supply pump and the instantaneous heating device to be connected to the ice-making unit; an ice-making water supply valve provided in the ice-making water inlet passage to be opened to supply the purified water filtered by the filter unit to the ice-making unit; a flow rate sensor installed upstream of a point at which the ice-making unit water inlet passage is branched to measure a flow rate of purified water supplied from the filter unit to the instantaneous heating device and the ice making unit, respectively; and a control unit for controlling driving of the supply pump and opening and closing of the ice-making water supply valve such that purified water, corresponding to a predetermined supply amount of ice-making water is supplied to the ice-making unit on the basis of a flow rate value measured by the flow rate sensor, wherein the control unit is configured to control opening and closing of the passage such that purified water is preferentially supplied to the instantaneous heating device among the instantaneous heating device and the ice-making unit.

Advantageous Effects of Invention

As set forth above, according to an embodiment of the present disclosure having such a configuration, an effect that extraction of hot water may be smoothly performed at a time desired by a user may be obtained. In particular, according to an embodiment of the present disclosure, even when a user inputs a hot-water extraction signal while water is being supplied to the ice-making unit, it is possible to obtain an effect that an operation for extracting hot water may be immediately performed.

In addition, according to an embodiment of the present disclosure, since a flow rate sensor used to control an instantaneous heating device is also used to supply ice-making water, it is possible to obtain an effect that a predetermined amount of water (ice-making water) may be stably supplied to the ice-making unit.

According to an embodiment of the present disclosure, water can be supplied to the ice-making unit by using a supply pump used to extract hot water from an instantaneous heating device to a water outlet member, such that it is possible to obtain that water can be supplied to the ice-making unit regardless of a height of the ice-making unit. Accordingly, it is possible to increase a degree of freedom in designing an installation position of the ice-making unit.

In addition, according to an embodiment of the present disclosure, since a supply pump and a flow rate sensor used in the instantaneous heating device can be efficiently used to supply ice-making water, it is possible to obtain an effect of reducing the number of parts and reducing the cost of parts.

MODE FOR INVENTION

Figure 1:
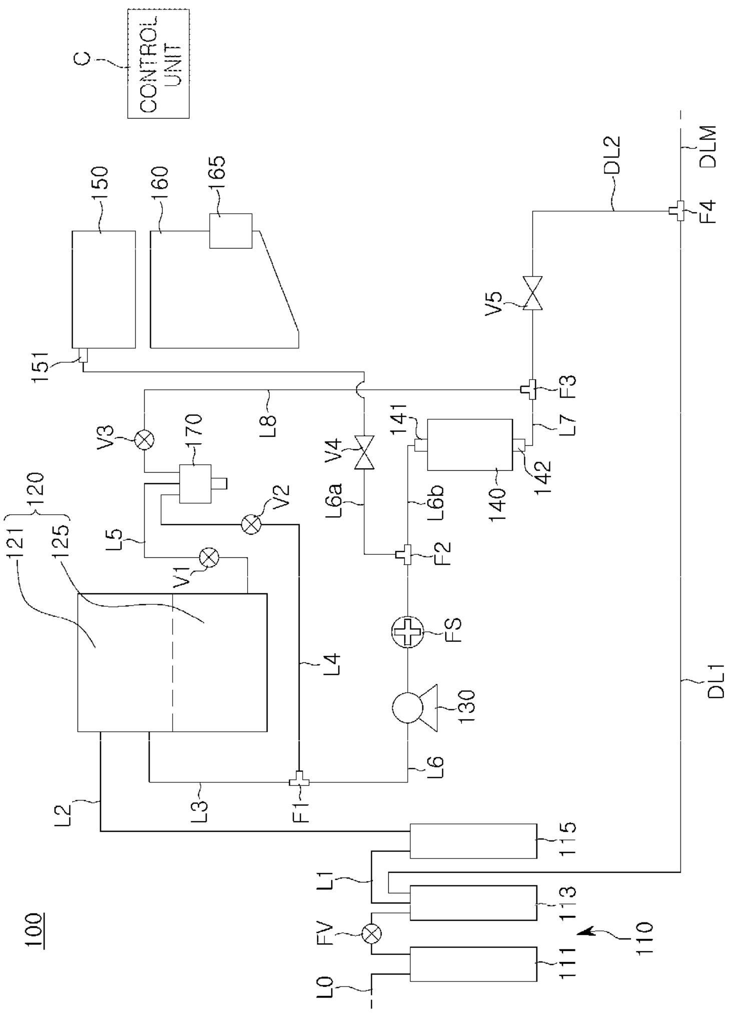
FIG. 1 is a schematic water pipe diagram of an ice-making water purifier according to an embodiment of the present disclosure.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided such that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity. In addition, the same reference numerals will be used throughout the drawings for elements having the same or similar functions and operations. Hereinafter, embodiments of the present disclosure will be described with reference to the drawings.

In addition, in the present specification, the singular expression includes a plural expression unless the context clearly dictates otherwise, and the same reference signs refer to the same element or corresponding element throughout the specification.

Hereinafter, embodiments of the present invention will be described with reference to the drawings.

First, an ice-making water purifier 100 according to an embodiment of the present disclosure will be described with reference to FIGS. 1 to 4.

Figure 2:
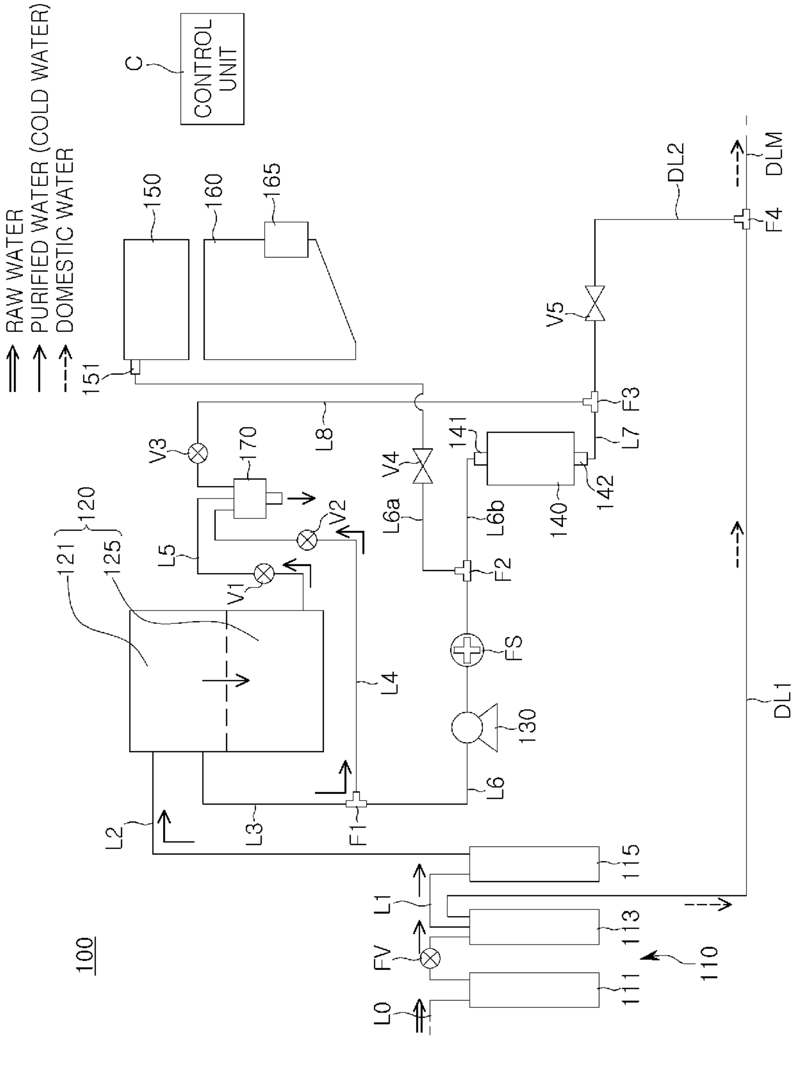
FIG. 2 is a water pipe diagram illustrating a flow of water when filtering of raw water and extraction of purified/cold water are performed in the ice-making water purifier illustrated in FIG. 1.
Figure 3:
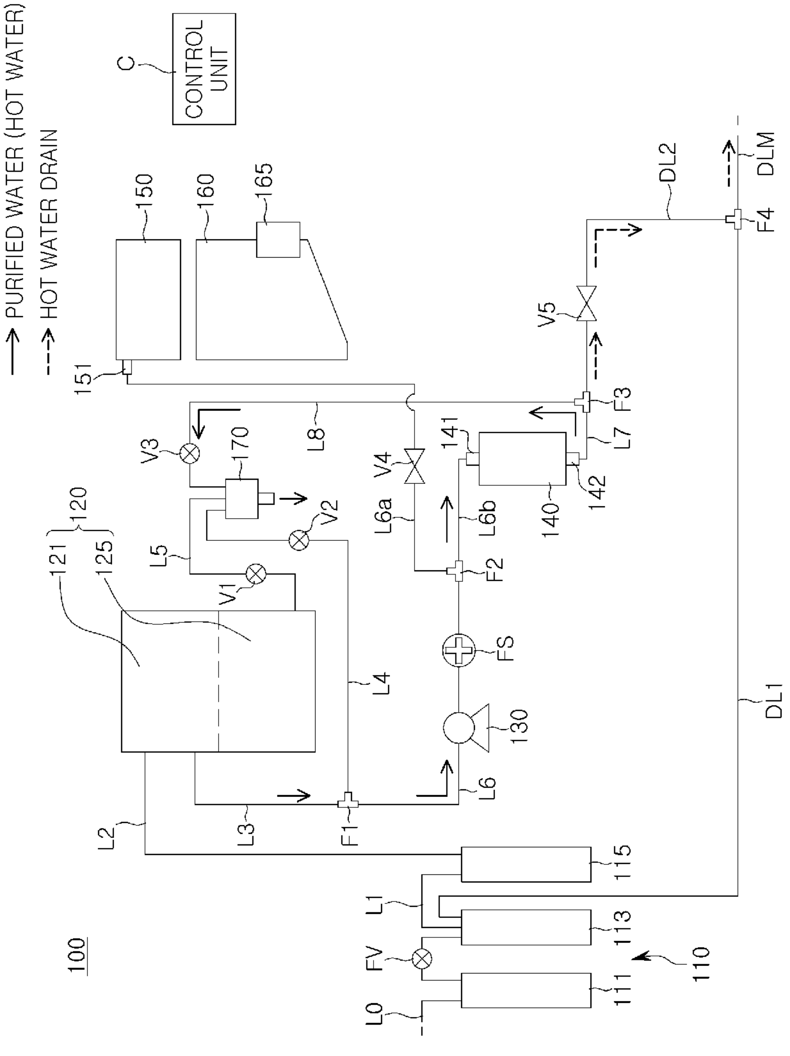
FIG. 3 is a water pipe diagram illustrating a flow of water when hot water is extracted from the ice-making water purifier illustrated in FIG. 1.
Figure 4:
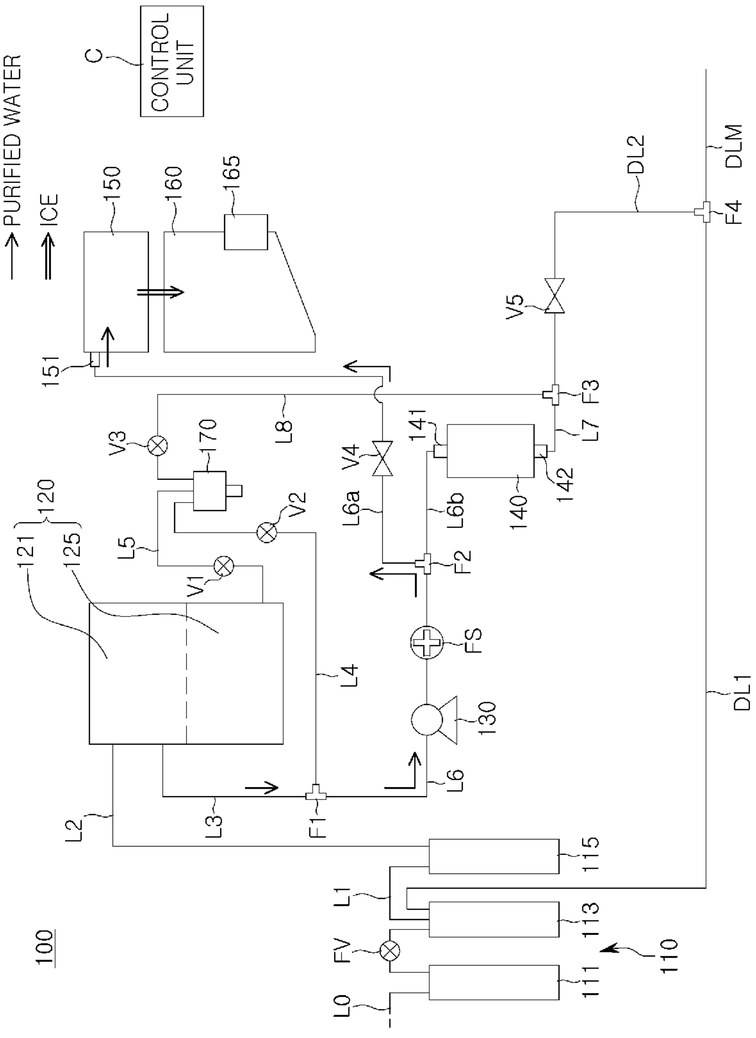
FIG. 4 is a water pipe diagram illustrating a flow of water when ice is made in the ice purifier illustrated in FIG. 1.

FIG. 1 is a schematic water pipe diagram of an ice-making water purifier 100 according to an embodiment of the present disclosure, and FIG. 2 is a water pipe diagram illustrating a flow of water when filtration of raw water and extraction of purified water/cold water are performed in the ice-making water purifier 100 illustrated in FIG. 1, FIG. 3 is a water pipe diagram illustrating a flow of water when hot water is extracted from the ice-making water purifier 100 illustrated in FIG. 1, and FIG. 4 is a water pipe diagram illustrating a flow of water, when ice is made in the ice-making water purifier 100 illustrated in FIG. 1.

Referring to FIG. 1, the ice-making water purifier 100 according to an embodiment of the present disclosure may be configured to include a filter unit 110, a water tank unit 120, a supply pump 130, an instantaneous heating device 140, an ice-making unit 150, an extraction member 170, a flow rate sensor FS, and various valves and passages and a control unit C, and may further include an ice storage 160, or the like.

The filter unit 110 is configured to filter raw water supplied through a raw water supply passage L0 to generate purified water, and to include a reverse osmosis membrane filter 113. The filter unit 110 may be configured to include a plurality of filters, like a general water purifier, and as an example, the filter unit 110 may include a pre-filter 111, a main filter 113, and a post-filter 115. The pre-filter 111 may be formed of a composite filter of a sediment filter and a pre-carbon filter, and the post-filter 115 may be formed of a post-carbon filter, or the like.

In addition, the main filter 113 is a filter capable of filtering the finest particles among filters provided in the filter unit 110. As an example, the main filter 113 may be a reverse osmosis membrane filter performing filtration while separating purified water and concentrated water by a reverse osmosis method as illustrated in FIGS. 1 to 4. However, as the main filter 113, a various known filter such as a hollow fiber membrane filter, a nano trap, a nano filter, and the like may be used. Hereinafter, for convenience of explanation, a case in which a reverse osmosis membrane filter (RO filter) 113 is used as the main filter 113 as illustrated in FIGS. 1 to 4 will be described as an example.

A supply valve FV that opens and closes to supply water to the reverse osmosis membrane filter 113 may be provided at a front end of the reverse osmosis membrane filter 113.

This supply valve FV may be configured to supply raw water to the filter unit 110, and a position thereof may be variously changed.

The filter unit 110 may be provided with a filter unit passage L1 connecting a plurality of filters to each other, and a domestic water drain line DL1 for draining domestic water (concentrated water) that has not passed through the reverse osmosis membrane filter 113 may be connected to the reverse osmosis membrane filter 113. Meanwhile, in the present specification and claims, the term 'drained' is defined as being used in the sense of discarding wastewater (drain water, domestic water, or the like) through various drain lines. In addition, the place to be 'drained' is not limited to a place outside of the ice-making water purifier 100, such as a sewer, but the place includes being drained into a drain tank (not illustrated) collecting various drain water generated from an inside of the ice-making water purifier 100 (e.g., the ice storage 170, the instantaneous heating device 140, and the like) inside the ice-making water purifier 100. In this case, the drain water accommodated in the drain tank may be drained through the main drain line DLM when the water level of the drain tank reaches a predetermined water level (e.g., full water level).

Referring to FIG. 2, raw water supplied to the filter unit 110 through the raw water supply passage L0 may be filtered by the filter unit 110, and the purified water filtered by the filter unit 110 may be stored in a water tank unit 120 through a purified water inlet passage L2. In this case, the water tank unit 120 may include a purified water tank 121 for accommodating the purified water filtered by the filter unit 110 at room temperature, and a cold water tank 125 for cooling and accommodating the purified water. The purified water at room temperature accommodated in the purified water tank 121 may be extracted from an extraction member 170 formed of a faucet, a coke, or the like, through a purified water outlet passage L3, a passage connection member F1, and a purified water extraction passage L4 according to the opening of the purified water extraction valve V2. In addition, the cold water accommodated in the cold water tank 125 may be extracted through the extraction member 170 through a cold-water extraction passage L5 according to the opening of the cold-water extraction valve V1. Meanwhile, domestic water (concentrated water) that has not passed through the reverse osmosis membrane filter 113 is drained through a main drain line DLM formed by merging of the domestic water drain line DL1 and various drain lines DL2.

A flow of water when extracting hot water and a flow of water during drainage of drain water generated in the instantaneous heating device 140 will be described with reference to FIG. 3.

Referring to FIG. 3, when a hot-water extraction signal is input by a user's operation of a hot water extraction button, the purified water accommodated in the purified water tank 121 of the water tank unit 120 may be supplied to the water inlet 141 of the instantaneous heating device 140 and heated while flowing in the instantaneous heating device 140 and may be discharged as hot water through the water outlet 142.

Since the instantaneous heating device 140 may generate steam due to overheating, the instantaneous heating device 140 is installed below the extraction member 170 in order to secure safety in using the instantaneous heating device 140. That is, since the extraction member 170 is located on an upper side of the instantaneous heating device 140, in order to extract hot water through the extraction member 170, it is required to supply water to the instantaneous heating device 140 by pressurizing water through the supply pump 130.

The purified water pressurized by the supply pump 130 flows into the water inlet 141 of the instantaneous heating device 140 through the flow passage connection member F2 and the hot-water supply flow passage L6*b*, is heated, and then is discharged through the water outlet 142. When a hot-water extraction signal is input, the instantaneous heating device 140 performs a heating operation by the control unit C, and accordingly, the instantaneous heating device 140 is configured to heat purified water flowing into the water inlet 141 and flowing out to the water outlet 142 such that hot water is discharged through the water outlet 142.

The hot water discharged through the water outlet 142 may be extracted through the extraction member 170 through the hot-water outlet passage L7 and the hot water extraction passage L8 according to the opening of the hot-water extraction valve V3.

In this case, for heating control according to a flow rate of purified water flowing into the instantaneous heating device 140, a flow rate sensor FS for measuring the flow rate flowing into the instantaneous heating device 140 may be installed at a front end of the instantaneous heating device 140. The flow sensor FS may be configured to measure not only the flow rate of purified water supplied from the water tank unit 120 to the instantaneous heating device 140, but also the flow rate of purified water supplied from the water tank unit 120 to the ice-making unit 150. To this end, the flow rate sensor FS may be installed upstream (front end based on a flow of water) of the flow passage connection member F2 at a point at which an ice-making unit water inlet passage L6*a* connected to the ice-making unit 150 from the flow passages L6 and L6*b* connecting the supply pump 130 and the instantaneous heating device 140.

The control unit C may perform voltage and/or current control applied to a heater provided in the instantaneous heating device 140 based on a flow rate measured by the flow rate sensor FS and a temperature of purified water on a side of the water inlet 141 measured by a temperature sensor (not illustrated) and a temperature of hot water on a side of the water outlet 142.

Meanwhile, when the instantaneous heating device 140 is operated after a hot-water extraction signal is input, since a temperature of water initially discharged from the instantaneous heating device 140 is low, the hot-water drain valve V5 is opened to the instantaneous heating device 140, such that the initially supplied purified water may be drained according to a predetermined first drainage condition (e.g., a predetermined flow rate or time). In addition, as a hot-water extraction end signal is input due to the user's stopping of hot water extraction or completion of the extraction of a predetermined amount of hot water, the hot-water drain valve V5 may be opened to drain the hot water remaining in the instantaneous heating device 140 in a predetermined second drain condition. (e.g., a predetermined flow rate or time).

As described above, when the hot-water drain valve V5 is opened, as indicated by the dotted line 'hot water drain' in FIG. 3, the drain water (waste water) drained from the instantaneous heating device 140 may be drained, through a main drain line DLM in which a hot-water drain line DL2 and a domestic water drain line DL1 and a hot-water drain line DL2 are joined through a flow passage connection member F4.

Next, a flow of water during ice-making will be described with reference to FIG. 4.

Referring to FIG. 4, a water purifier 100 according to an embodiment of the present disclosure may include an ice-making unit 150 for generating ice, and an ice storage 160 for storing the ice generated by the ice making unit 150.

The ice-making unit 150 may cool water (ice-making water) supplied using a known cooling system to generate ice, and ice-making tray (not illustrated) may be provided to accommodate the supplied water. In addition, an immersion tube connected to an evaporator may be immersed in the ice-making tray, and as a cold refrigerant flows in the evaporator, ice may be formed around the immersion tube. As described above, the ice-making unit 150 may use an immersion-type ice-making method, but even an ice-making tray is provided, various known ice-making methods may be used. In addition, as a cooling system for generating ice, a conventional cooling system including a compressor, a condenser, and an evaporator, may be used, but an embodiment thereof is not limited thereto, and a cooling method using a thermoelectric module may be used.

As an ice-making water supply valve V4 is opened, purified water (ice-making water) accommodated in the purified water tank 121 of the water tank unit 120 may be supplied to the ice-making tray of the ice-making unit 150.

When an ice-making start signal is generated due to insufficient amount of ice contained in the ice storage 160, driving of the supply pump 130 and opening of the ice-making water supply valve V4 may be performed by the control unit C, and accordingly, as illustrated in FIG. 4, the purified water accommodated in the purified water tank 121 is introduced into the supply pump 130 through the purified water tank 121, a purified water outlet passage L3, and a purified water supply passage L6.

When the water tank unit 120 is not positioned higher than an ice-making water supply port 151 of the ice-making unit 150 or a sufficient difference in water head is not secured, ice-making water (purified water) is not supplied only by opening an ice-making water supply valve V4. In this case, in order to supply ice-making water from the water tank unit 120 to the ice-making water supply port 151, the supply pump 130 is driven to pressurize water and supply the same to the ice-making unit 150. For example, when the ice-making unit 150 is installed in a horizontal position with at least a portion of the water tank unit 120, the supply pump 130 may be driven to smoothly supply ice-making water, and purified water may be introduced to the ice-making unit 150 from the water tank unit 120 by pressurization of the supply pump 130. In addition, as illustrated in FIG. 4, when ice-making water (purified water) is supplied from the purified water tank 121 of the water tank unit 120 to the ice-making unit 150, if the ice-making unit 150 is installed in a horizontal position with at least a portion of the purified water tank 121, ice-making unit (purified water) may be smoothly introduced to the ice-making unit 150 from the water tank unit 130 by the pressurization of the supply pump 130.

Therefore, according to an embodiment of the present disclosure, since the supply pump 130 used for extracting hot water from the instantaneous heating device 140 to the extraction member 170 is also used to supply ice-making water to the ice-making unit 150, there is an advantage in that the supply pump 130 may be efficiently used. In addition, according to an embodiment of the present disclosure, since ice-making water may be supplied to the ice-making unit 150 using a supply pump 130, the ice-making water may be supplied to the ice-making unit 150 regardless of a height of the ice-making unit 150, and accordingly, it is possible to increase a degree of design freedom for an installation position of the ice-making unit 150.

Purified water accommodated in the water tank unit 120 may be supplied to the ice-making unit 150 according to the opening of the ice-making water supply valve V4 installed in an ice-making water inlet passage L6*a*. That is, the purified water accommodated in the water tank unit 120 is supplied to the ice-making unit 150 through the ice-making water supply port 151 through the ice-making water inlet passage L6*a* by pressurizing and driving the supply pump 130. In this case, the ice-making water inlet passage L6*a* may be branched from passages L6 and L6*b* connecting the supply pump 130 and the instantaneous heating device 140, and a passage connection member F2 may be installed at the branched point.

Meanwhile, a flow rate of purified water supplied to the ice-making unit 150 may be measured by a flow rate sensor FS. That is, the control unit C may be configured to control driving of the supply pump 130 and opening and closing of the ice-making water supply valve V4 such that purified water corresponding to a predetermined supply amount of ice-making water is supplied to the ice-making unit 150 based on a flow rate valve measured by the flow rate sensor. To this end, the control unit C may have a configuration in which an amount of purified water supplied to the ice-making unit 150 is accumulated to compare an accumulated supply amount of purified water and a supply amount of ice-making water.

Accordingly, according to an embodiment of the present disclosure, there is an advantage in that an accurate amount of ice-making water may be supplied to the ice-making unit 150 based on the measured value of the flow rate sensor FS. Furthermore, according to an embodiment of the present disclosure, since the flow rate sensor GS used for heating control of the instantaneous heating device 140 is also used to control a flow rate of the ice-making water supplied to the ice-making unit 150, the flow rate sensor FS may be used efficiently.

Also, when the supply of purified water to the ice-making unit 150 is stopped in the middle, the control unit C may be configured to store the accumulated supply amount of purified water supplied until the ice-making water supply valve V4 is closed in a memory, and when the supply of purified water to the ice-making unit 150 is resumed, the control unit C may be configured to supply purified water of the supply amount of ice-making water to the ice-making unit 150 based on the accumulated supply amount stored in the memory.

In addition, the ice generated by the ice maker 150 may be accommodated in the ice storage 160 through an ice removal process. For such ice removal, a method of supplying hot gas, which is a high-temperature refrigerant, to the evaporator may be used, but a method of removing ice by heating the evaporator by a heater may also be used.

The ice storage 160 may be located below the ice-making unit 150 to accommodate the ice removed, and the ice stored in the ice storage 160 may be provided to a user through the ice extraction port 165.

Next, a configuration for controlling supply of water to the instantaneous heating device and supply of water to the ice-making unit through a control unit C will be described with reference to FIGS. 3 and 4.

In the case of the ice-making water purifier 100 according to the embodiment of the present disclosure, when purified water is supplied from the purified water tank 121 of the water tank unit 120 to the instantaneous heating device 140 or the ice-making unit 150, the control unit C may control the opening and closing of the passage such that purified water is preferentially supplied to the instantaneous heating device 140 among the instantaneous heating device 140 or the ice-making unit 150. That is, when the purified water is supplied from the purified water tank 121 of the water tank unit 120 to the instantaneous heating device 140 and the ice-making unit 150 at the same time, the control unit C may be configured such that purified water may be preferentially supplied to the instantaneous heating device 140.

Specifically, when a hot-water extraction button (not illustrated) provided on an operation panel of the ice-making water purifier 200 is input by a user, the control unit C may be configured to make the ice-making water supply valve V4 closed whether purified water is being supplied to the ice-making unit 150 such that purified water (ice-making water) may not be supplied to the ice-making unit 150, to drive the supply pump 130 such that purified water may not be supplied to the instantaneous heating device 140. Thereby, the control unit C may be configured such that the purified water is preferentially supplied to the instantaneous heating device 140 than the purified water is supplied to the ice-making unit 150.

Meanwhile, when the instantaneous heating device 140 is operated after the hot-water extraction signal is input, since a temperature of water initially discharged from the instantaneous heating device 140 is low, it can be prevented from being extracted through the extraction member 170. To this end, the control unit may be configured to drain the purified water initially supplied to the instantaneous heating device 140 by opening a hot-water drain valve V5 according to a predetermined first drain condition (e.g., a predetermined flow rate or time). In this case, after the predetermined first drain condition has elapsed, the hot-water drain valve V5 may be closed and the hot-water extraction valve V3 may be opened, such that the water heated by the instantaneous heating device 140 may be discharged through the extraction member 170.

Then, when a hot-water extraction signal is input while purified water is supplied to the ice-making unit 150 by opening an ice-making water supply valve V4, the control unit C may be configured to close the ice-making supply valve V4 such that the supply of purified water to the ice-making unit 150 may be stopped, and the supply of purified water to the instantaneous heating device 140 may be performed. Thereafter, when a hot-water extraction end signal is input due to stopping of hot-water extraction and completion of extraction of a predetermined amount of hot water by a user, the control unit C may be configured to stop the supply of purified water to the instantaneous heating device 140. As described above, when the hot-water extraction is finished and the supply of purified water to the instantaneous heating device 140 is stopped, the control unit C may continue the supply of purified water, previously stopped, to the ice-making unit 150. To this end, the control unit C may be configured to open the ice-making water supply valve V4 again such that the remaining amount of purified water, not supplied to the ice-making unit 150 due to the stopping of the supply of purified water among the supply amount of the ice-making water.

In this case, the control unit C may be configured to accumulate an amount of purified water supplied to the ice-making unit 150 based on the measured value of the flow rate sensor FS, and store the accumulated supply amount of purified water supplied to the ice-making unit 150 until a hot-water extraction signal is input such that the supply of purified water to the ice-making unit 150 is stopped. When the supply of purified water to the ice maker 150 is resumed, the control unit C may compare the accumulated supply amount stored in the memory with a supply amount of ice-making water to supply the difference equal to the purified water to the ice-making unit 150. When the supply of purified water to the ice-making unit 150 is completed, the accumulated supply amount may be reset.

Meanwhile, when a hot-water extraction end signal is input due to a user's stopping hot-water extraction or completion of extraction of a predetermined amount of hot water, a hot-water extraction valve V3 is closed and then purified water may be supplied to the ice-making unit 150 immediately, but purified water may be supplied to the ice-making unit 150 after a final drain process of draining high-temperature hot water remaining in the instantaneous heating device 140. When the final drain process is performed, when a hot-water extraction end signal is input, the control unit C may be configured to open a hot-water drain valve V5 to drain hot water accommodated in the instantaneous heating device 140 under a predetermined second drain condition (for example, a predetermined flow rate or time). After the final drain process is performed, the control unit C may be configured to make both the hot-water extraction valve V3 and the hot-water drain valve V5 to be in a closed state such that the supply of purified water to the instantaneous heating device 140 is stopped, and open the ice-making water supply valve V4 again such that purified water is supplied to the ice-making unit 150.

Also, an ice-making signal for generating ice may be input by extracting ice from the ice storage 160, or the like in a state in which purified water is supplied to the instantaneous heating device 140.

In this case, the control unit C may supply purified water to the ice-making unit 150 after the supply of purified water to the instantaneous heating device 140 is completed such that ice may be made by the ice-making unit 150. That is, when an ice-making signal is input in a state in which purified water is supplied to the instantaneous heating device 140, the control unit C may prevent the supply of purified water to the ice-making unit 150 until the supply of purified water to the instantaneous heating device 140 is finished.

That is, when an ice-making signal is input in a state in which purified water is supplied to the instantaneous heating device 140, the control unit C may prevent the supply of purified water to the ice-making unit 150 until the supply of purified water to the instantaneous heating device 140 is finished. Thereafter, when a hot-water extraction end signal is input due to the user's stopping of hot water extraction or finishing of the extraction of a predetermined amount of hot water, after the supply of purified water to the instantaneous heating device 140 is finished, the control unit C may be configured to open the ice-making water supply valve V4 such that purified water corresponding to a supply amount of ice-making water is supplied to the ice-making unit 150.

In this case, when the terminal drain process is not performed, purified water may be supplied to the ice-making unit 150 immediately after the hot-water extraction end signal is input, and when the terminal drain process is performed, purified water may be supplied to the ice-making unit 150 after the terminal drain process is performed.

As described above, according to an embodiment of the present disclosure, purified water may be preferentially supplied to the instantaneous heating device 140 among the instantaneous heating device 140 and the ice-making unit 150, such that hot water can be smoothly extracted at the time desired by a user. That is, when a user inputs a hot-water extraction signal while water is being supplied to the ice-making unit 150, the ice-making water purifier in the prior art continues to supply purified water to the ice-making unit during an operation time of a timer, such that there was an inconvenience in that the user had to wait until the supply of purified water to the ice-making unit is completed. However, according to an embodiment of the present disclosure, since purified water is preferentially supplied to the instantaneous heating device 140, when a hot-water extraction signal is input, an operation for hot-water extraction can be immediately switched, hot-water extraction can be performed within a short time.

In addition, according to an embodiment of the present disclosure, in a process of supplying purified water (ice-making water) to the ice-making unit 150, an accurate amount of purified water corresponding to a supply amount of ice-making water using a flow rate sensor FS may be supplied to the ice-making unit 150. In particular, according to an embodiment of the present disclosure, since an amount of purified water supplied to the ice-making unit 150 is accumulated, and a supply amount of purified water supplied to the ice-making unit 150 when the supply of ice-making water is stopped, is accumulated and stored in a memory, and when the supply of ice-making water is resumed, and an accumulated flow rate value may be compared with the supply amount of ice-making unit, such that insufficient amount of purified water may be supplied, even when the supply of ice-making water is stopped in the middle, an accurate amount of purified water corresponding to the supply amount of purified water may be supplied to the ice-making unit 150.

Meanwhile, unlike the ice-making water purifier 100 illustrated in FIGS. 1 to 4, the ice-making water purifier 100 according to the modified embodiment of the present disclosure may not include a water tank unit 120.

In this case, purified water filtered by the filter unit 110 may be extracted through an extraction member 170 according to opening of a purified water extraction valve V2. In this case, the purified water inlet passage L2 illustrated in FIG. 1 may be directly connected to a purified water outlet passage L3 without interposing the water tank unit 120.

In addition, purified water filtered by the filter unit 110 may be supplied to the instantaneous heating device 140 or supplied to the ice-making unit 150 without passing through the water tank unit 120. In this case, the supply pump 130 may be configured to receive purified water filtered by the filter unit 110 and pressurize and supply the same to the instantaneous heating device 140 and the ice-making unit 150.

As described with reference to the embodiments illustrated in FIGS. 1 to 4, even in the case of the embodiment of the ice-making water purifier not including the water tank unit 120, the control unit C may control the opening and closing of the passage such that purified water is preferentially supplied to the instantaneous heating device 140 among the ice-making unit 150.

In this case, as a specific control method of the control unit C, the same control method as the control method described through the embodiments illustrated in FIGS. 1 to 4 may be applied. Accordingly, a detailed description of the ice-making water purifier 100 having a configuration that does not include the water tank unit 120 will be omitted and will be replaced with the above description.

While example embodiments have been shown and described above, it will be apparent to those skilled in the art that modifications and variations could be made without departing from the scope of the present disclosure as defined by the appended claims.

In addition, in the embodiment of the present disclosure, some components may be implemented in a deleted state, and the configuration of each embodiment may be configured in combination with each other.

DESCRIPTION OF REFERENCE NUMERALS

100 . . . Water Purifier, 110 . . . Filter Unit,
111 . . . Pre-Filter, 113 . . . Main Filter (Reverse Osmosis Membrane Filter),
115 . . . Post Filter, 120 . . . Water Tank Unit,
121 . . . Water Tank. 125 . . . Cold Water Tank,
130 . . . Supply Pump, 140 . . . Instantaneous Heating Device,
141 . . . Water Inlet, 142 . . . Water Outlet,
150 . . . Ice-Making Unit, 151 . . . Ice-Making Water Supply Port,
160 . . . Ice Storage, 165 . . . Ice Extraction Port,
170 . . . Extraction Member, C . . . Control Unit,
D11 . . . Domestic Water Drain Line, D12 . . . Hot-Water Drain Line,
D1*m* . . . Main Drain Line, F1, F2, F3, F4 . . . Passage Connection Member,
Fs . . . Flow Rate Sensor, Fv . . . Supply Valve
L0 . . . Raw Water Supply Passage, L1 . . . Filter Unit Passage,
L2 . . . Purified Water Inlet Passage, L3 . . . Purified Water Outlet Passage,
L4 . . . Purified Water Extraction Passage, L5 . . . Cold Water Extraction Passage
L6 . . . Purified Water Supply Passage, L6*a* . . . Ice-Making Unit Inlet Passage,
L6*b* . . . Hot Water Inlet Passage, L7 . . . Hot Water Outlet Passage,
L8 . . . Hot Water Extraction Passage, V1 . . . Cold Water Extraction Valve,
V2 . . . Purified Water Extraction Valve, V3 . . . Hot Water Extraction Valve,
V4 . . . Ice-Making Water Supply Valve, V5 . . . Hot Water Drain Valve

The invention claimed is:

1. An ice-making water purifier, comprising:

a water tank configured to store purified water;

an instantaneous heater having a water inlet through which purified water is supplied from the water tank and a water outlet through which purified water is heated and discharged, the instantaneous heater being configured to heat the purified water flowing into the water inlet, wherein hot water is discharged through the water outlet;

an extraction member located above the instantaneous heater and configured to extract the hot water discharged from the instantaneous heater by opening a hot-water extraction valve;

an ice-maker configured to receive purified water from the water tank and to produce ice;

a supply pump configured to supply purified water from the water tank to the instantaneous heater and the ice-maker;

an ice-maker water inlet passage branched from a passage connecting the supply pump and the instantaneous heater, so as to be connected to the ice-maker;

an ice-making water supply valve provided in the ice-maker water inlet passage and configured to be opened to supply purified water from the water tank to the ice-maker;

a flow rate sensor installed upstream of a point at which the ice-maker water inlet passage is branched to measure a flow rate of the purified water supplied from the water tank to the instantaneous heater and the ice-maker, respectively; and a controller configured to control driving of the supply pump and opening and closing of the ice-making water supply valve such that purified water corresponding to a predetermined supply amount of ice-making water is supplied to the ice-maker on a basis of a flow rate value measured by the flow rate sensor, wherein the controller is configured to control opening and closing of the passage such that purified water is supplied to the instantaneous heater among the instantaneous heater and the ice-maker, when an ice-making signal for producing ice in a state in which purified water is input to the instantaneous heater, the controller is configured such that purified water is not supplied to the ice-maker, and the controller is configured to open the ice-making water supply valve after the supply of purified water to the instantaneous heater is finished, such that purified water corresponding to the supply amount of the ice-making water is supplied to the ice-maker.

2. The ice-making water purifier of claim 1, wherein the ice-maker is installed in a horizontal position with at least a portion of the water tank, and is configured such that purified water is introduced to the ice-maker from the water tank by pressurization of the supply pump.

3. The ice-making water purifier of claim 2, wherein the water tank comprises a purified water tank configured to accommodate purified water at room temperature, wherein the ice-maker is installed in a horizontal position with at least a portion of the purified water tank.

4. The ice-making water purifier of claim 1, wherein, when a hot-water extraction signal is input, the controller is configured to close the ice-making water supply valve and drive the supply pump such that purified water is supplied to the instantaneous heater.

5. The ice-making water purifier of claim 4, wherein, when the hot-water extraction signal is input, the controller is configured to perform an initial drain process for draining purified water initially supplied to the instantaneous heater according to a predetermined first drain condition, and open the hot-water extraction valve after the initial drain process is performed, such that hot water is extracted through the extraction member.

6. The ice-making water purifier of claim 1, wherein, when a hot-water extraction signal is input, while purified water is supplied to the ice-maker by opening of the ice-making water supply valve, the controller is configured to:

close the ice-maker water supply valve such that supply of purified water to the ice-maker is blocked and supply of purified water to the instantaneous heater is performed, and open the ice-maker water supply valve again when the supply of purified water to the instantaneous heater is stopped due to an input of a hot-water extraction end signal such that a remaining amount of purified water, not supplied to the ice-maker, among the supply amount of ice-making water is supplied to the ice-maker.

7. The ice-making water purifier of claim 6, wherein the controller is configured to accumulate an amount of purified water supplied to the ice-maker based on a measured value of the flow rate sensor, store the accumulated amount of purified water supplied until the hot-water extraction signal is input and the ice-making water supply valve is closed, and control supply of purified water to the ice-maker based on the stored accumulated supply amount when the supply of purified water to the ice-maker is resumed.

8. The ice-making water purifier of claim 6, wherein, when the hot-water extraction end signal is input, the controller is configured to perform a final drain process of draining hot water accommodated in the instantaneous heater according to a predetermined second drain condition, stop the supply of purified water to the instantaneous heater after the final drain process is performed, and open the ice-making water supply valve again such that purified water is supplied to the ice-maker.

9. The ice-making water purifier of claim 1, wherein the controller is configured to control a voltage or current applied to the instantaneous heater based on a flow rate value supplied by the flow rate sensor.

10. An ice-making water purifier, comprising:

a filter unit having at least one filter configured to generate purified water;

an instantaneous heater having a water inlet through which purified water is filtered by the filter unit and a water outlet through which purified water is heated and discharged, and being configured to heat the purified water flowing into the water inlet, wherein hot water is discharged through the water outlet;

an extraction member located above the instantaneous heater and extracting the hot water discharged from the instantaneous heater by opening a hot-water extraction valve;

an ice-maker configured to receive the purified water filtered by the filter unit and to produce ice;

a supply pump configured to operate the purified water filtered by the filter unit to the instantaneous heater and the ice-maker;

an ice-maker water inlet passage branched from a passage connecting the supply pump and the instantaneous heater to be connected to the ice-maker;

an ice-making water supply valve provided in the ice-maker water inlet passage configured to be opened to supply the purified water filtered by the filter unit to the ice-maker;

a flow rate sensor installed upstream of a point at which the ice-maker water inlet passage is branched configured to measure a flow rate of purified water supplied from the filter unit to the instantaneous heater and the ice maker, respectively; and a controller configured to control driving of the supply pump and opening and closing of the ice-making water supply valve such that purified water corresponding to a predetermined supply amount of ice-making water is supplied to the ice-maker on a basis of a flow rate value measured by the flow rate sensor, wherein the controller is configured to control opening and closing of the passage such that purified water is supplied to the instantaneous heater among the instantaneous heater and the ice-maker, when an ice-making signal for producing ice in a state in which purified water is input to the instantaneous heater, the controller is configured such that purified water is not supplied to the ice-maker, and the controller is configured to open the ice-making water supply valve after the supply of purified water to the instantaneous heater is finished, such that purified water corresponding to the supply amount of the ice-making water is supplied to the ice-maker.

* * * * *